United States Patent [19]

Zakich

[11] Patent Number: 4,958,933

[45] Date of Patent: Sep. 25, 1990

[54] COOLER-EXTRUDER DEVICE

[76] Inventor: Paul Zakich, 721 Cliffside Dr., Akron, Ohio 44313

[21] Appl. No.: 275,923

[22] Filed: Nov. 25, 1988

[51] Int. Cl.$^5$ ............................................... B29B 1/06
[52] U.S. Cl. .......................................... 366/81; 366/83; 366/144; 366/291; 366/312
[58] Field of Search ............... 366/149, 312, 313, 309, 366/291, 83, 84, 319, 81, 311, 79; 62/342, 343, 354; 165/94, 95; 425/200, 204, 205, 207, 208, 382.3; 15/246.5, 104.04, 104.05, 246

[56] References Cited

U.S. PATENT DOCUMENTS

| | | | |
|---|---|---|---|
| 2,191,349 | 2/1940 | Erickson | 62/343 |
| 3,029,615 | 4/1962 | Lindsey | 62/343 |
| 3,069,866 | 12/1962 | Dunn | 62/343 X |
| 3,070,836 | 1/1963 | DeHaven | 425/204 X |
| 3,145,017 | 8/1964 | Thomas | 366/311 X |
| 3,163,403 | 12/1964 | Engels | 366/149 |
| 3,779,522 | 12/1973 | Loomans | 366/83 X |
| 3,848,289 | 11/1974 | Bachmann | 15/246.5 |
| 3,958,968 | 5/1976 | Hosaka | 62/343 |
| 4,095,307 | 6/1978 | Brubaker | 165/94 X |
| 4,127,372 | 11/1978 | Perla | 425/382.3 X |
| 4,134,714 | 1/1979 | Driskill | 425/208 X |

Primary Examiner—Robert W. Jenkins
Attorney, Agent, or Firm—Renner, Kenner, Greive, Bobak, Taylor & Weber

[57] ABSTRACT

A novel plastic extruder is taught which employs a compound feed screw having both a flights' section, and a wiper section adjacent thereto. The compound feed screw is positioned in a jacketed extruder barrel through which a foam plastic melt is propelled and cooled by means of a coolant circulated through the jacket, or other cooling means, prior to being forced through a die to form a cellular plastic sheet. The flights' section of the feed comprises a helical spiral ridge machined on a rotatable shaft, while the wiper section comprises a plurality of wiper blade assemblies mounted longitudinally on pairs of spaced apart, raised circular ridges, machined on the shaft, adjacent wiper blade assemblies being mounted radially displaced relative to each other.

13 Claims, 3 Drawing Sheets

COOLER-EXTRUDER DEVICE

TECHNICAL FIELD

This invention relates to plastic extrusion processes. More particularly, the invention relates to equipment for cooling foamed plastic compositions after the addition of blowing agents, but prior to extrusion of the compositions through a forming die. Specifically, this invention relates to a cooler-extruder having a compound feed screw, which in addition to a flights' section, is provided with a wiper section comprising revolving blades, or wipers, which scrape the internal walls of an extruder barrel encased in a cooling jacket or other cooling means. Stationary plastic material is thereby dislodged from the barrel, improving the heat transfer through its walls.

BACKGROUND OF THE INVENTION

In the process of extruding cellular plastic foams, solid plastic particles, typically small solid cubes of the desired plastic, and if desired various compounding ingredients included therein, are fed into a primary extruder where they are propelled along the extruder barrel by action of the extruder feed screw. The energy imparted by the action of the feed screw melts the plastic into a homogeneous mass, whereupon a blowing agent is introduced through an inlet port in the side of the barrel. After incorporation of the blowing agent, the composition is cooled in a secondary extruder to the point at which its viscosity is increased sufficiently to extrude the melt through a forming die into the desired finished shape.

In the past, cooling has frequently been accomplished by feeding the foamed melt into an additional extruder, often termed a "secondary" foam extruder, wherein the melt is propelled along an extruder barrel by means of a conventional feed screw, being cooled in the process by heat transfer through the wall of the barrel. Unfortunately, however, some of the melted mass located in the space provided for necessary clearance between the barrel wall and the feed screw remains essentially stationary, providing an insulating barrier which decreases heat transfer through the barrel wall. Furthermore, the stationary mass is ordinarily present in the form of a semisolid, or solid, which acts as a brake on the feed screw, resulting in more energy being required to turn it, and in the additional generation of unwanted heat, due to frictional effects.

In the prior art, attempts have been made to improve the heat transfer of heat exchanger devices through provision of scraping implements. One approach is such as shown in U.S. Pat. No. 4,185,352.

In view of the foregoing, therefore, it is a first aspect of this invention to provide a heat exchange device, herein termed a "cooler extruder," which provides greatly improved heat transfer, thereby allowing higher production rates to be achieved.

A second aspect of the invention is to provide a cooler-extruder which requires less energy consumption than alternative heat transfer devices.

An additional aspect of this invention is to make available a cooler-extruder whose wiper section employes wiper blades spaced apart from the shaft which rotates them, thereby providing an opening which allows the blades to be rotated through the plastic melt with less overall expenditure of energy.

Another aspect of this invention is to provide a cooler-extruder with easily replaceable parts at points of high wear.

A further aspect of the invention is the provision of a cooler-extruder with more economical, smaller components, including its drive motor, cooling jacket, barrel, and feed screw.

An added aspect of the invention is to permit higher rates of extrusion to be achieved by providing more rapid cooling of a plastic melt in a jacketed extruder barrel.

DISCLOSURE OF THE INVENTION

The preceding and other aspects of the invention are provided by a cooler-extruder employing a compound feed screw which includes a flights' section adjacent to a wiper section, and which is positioned in an extruder barrel to propel plastic material in said barrel first through said flights' section, and then through said wiper section, wherein said flights' section comprises a helical spiral ridge forming an integral part of, and around a rotatable shaft, and said wiper section comprises a plurality of wiper blade assemblies tangentially mounted on pairs of spaced apart, raised, circular ridges on said shaft, adjacent wiper assemblies being mounted circumferentially displaced relative to each other, and wherein said barrel is provided with means for cooling the material being propelled therethrough.

The preceding and still other aspects of this invention are provided by a cooler-extruder according to the preceding paragraph employed in combination with a primary extruder, wherein a blowing agent is introduced into melted plastic being propelled by a feed screw through the barrel of said primary extruder, after which the plastic material is introduced into said cooler-extruder.

The preceding and still further aspects of this invention are provided by a compound feed screw for an extruder barrel which includes a flights' section adjacent to a wiper section, said flights' section comprising a helical spiral ridge forming an integral part of, and around a rotatable shaft, said wiper section comprising a plurality of wiper blade assemblies tangentially mounted on pairs of spaced apart, circular ridges on said shaft, adjacent wiper assemblies being mounted circumferentially displaced relative to each other.

The preceding and yet further aspects of this invention are provided by a wiper blade assembly adapted for mounting on the shaft of a plastic foam extruder comprising a removable blade member attached to a blade supporting mounting flange, said mounting flange having two parallel, spaced apart arm members connected thereto, and disposed at right angles therefrom, said arms furnishing means for attaching said assembly to circular ridges forming an integral part of said shaft so as to provide an opening between said blade supporting mounting flange, said arms, and said shaft.

The preceding and other aspects of the invention are provided by the modification of a feed screw having only a flights' section, accomplished by removing a part of said flights' section, and replacing it with a wiper section, and modifying the temperature control system to compensate for changes in the rate of heat transfer.

BRIEF DESCRIPTION OF THE DRAWINGS

The invention will be better understood when reference is had to the drawings herein, in which like numbers refer to like parts, and in which.

BEST MODE FOR CARRYING OUT THE INVENTION

Figure 1:
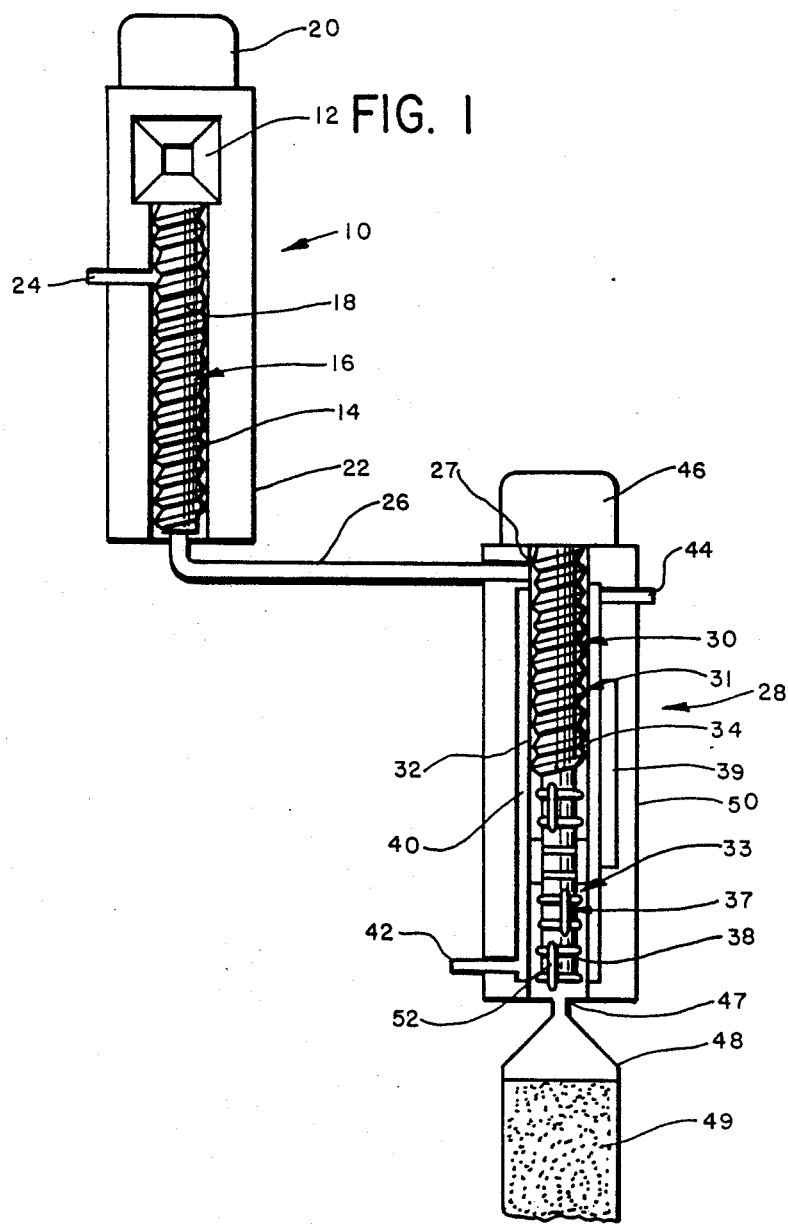
FIG. 1 is a semischematic representation of the cooler-extruder of the invention employed in conjunction with a primary extruder.

FIG. 1 illustrates a semischematic representation of the cooler-extruder of the invention illustrated generally by the numeral 28, employed in conjunction with a primary extruder, shown generally by the numeral 10. In the Figure, the primary extruder 10 is shown comprising a feed screw 16 with flights 18 machined as an integral part thereon, mounted in a barrel 14, and rotated by drive 20. The primary extruder 10 is fed through feed hopper 12 with cubes of a plastic compound, and a blowing agent is introduced through access port 24. The components described, mounted on base 22, produce a plastic melt which is transferred through a crossover pipe 26 to melt entry point 27 of the cooler-extruder 28. The cooler-extruder 28 comprises a compound feed screw 30 which includes a flights' section, generally 31, and a wiper section, generally 33. The flights' section 31 has flights 34 machined thereon, while the wiper section, generally 33, is fitted with attached wiper blade assemblies, generally 37. As shown, the wiper blade assemblies comprise blade members 52 mounted on adjacent pairs of machined circular ridges 38. The compound feed screw, generally 30, is fitted and rotates within barrel 32 which is surrounded by a cooling jacket 40, or other cooling means provided with heat transfer fluid inlet 42, and an outlet 44. Drive 46 rotates the compound feed screw 30, urging the plastic melt, the temperature of which is controlled by temperature control unit 39, through barrel 32 to melt exit point 47 where it encounters die 48, which forms the melt into a desired shape 49. The components comprising the cooler-extruder 28 are mounted on a base 50.

Normally, it has been found preferable to design the compound feed screw 30 so that the wiper section 33 constitutes from about 30% to 40% of the combined length of the wiper section and the flights' section 31. In addition, it is preferable that the ratio of the distance from the melt entry point 27 to the melt exit point 47, relative to the inside diameter of the barrel 32, be from about 16 to 32. The advantages which the invention provides are particularly apparent with barrel diameters of from about 3.5 to 8 inches.

While a single cooling jacket 40 is illustrated in FIG. 1, a plurality of cooling jacket compartments, each with its separate inlet and outlet, may be sequentially located along the length of the barrel 32. Typically, while other heat transfer mediums can be employed, water will be used within cooling jacket 40. Because of the wiping action provided by the compound feed screw 30, the cooling water employed may be as hot as 150° F. to 250° F., assuming provision is made for operating above atmospheric pressure when temperatures over 212° F. are employed. The flights' section 31 provides the primary cooling, with the wiper section 33 supplying the additional cooling, as required. Variables such as, for example, the number of blades 52, the length of the wiper section 33, the cooling water temperatures, compound feed screw r.p.m. and similar matters will depend upon the plastic material being processed, and other related factors and requirements, optimal values readily being determined by simple tests.

Figure 2:
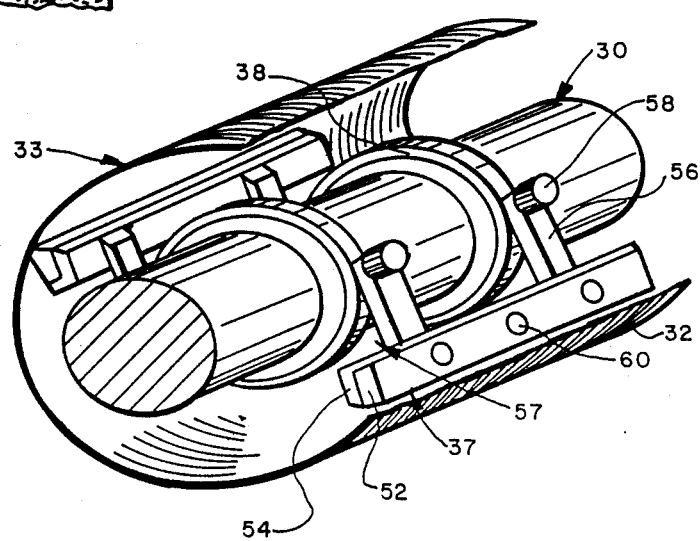
FIG. 2 is a isometric view of a portion of a wiper section showing wiper blade assemblies mounted on a compound feed screw located within the barrel of a cooler-extruder.

FIG. 2 is an isometric view of a portion of the wiper section 33 showing wiper blade assemblies 37 mounted on a compound feed screw 30 within an extruder barrel 32. As shown in FIG. 2, the wiper blade assembly 37 comprises a blade member 52 attached by blade fasteners 60, typically rivets, although other fasteners may be employed for the purpose, to blade-supporting mounting flange 54. Mounting flange 54 is connected to arms 56, which in turn are connected to circular ridges 38 by means of mounting screws 58. As will be seen from FIG. 2, by mounting wiper blade assembly 37 on pairs of adjacent circular ridges 38, the latter forming an integral part of compound feed screw 30, a relatively large opening, shown generally by the numeral 57 is provided which allows the plastic melt to flow readily past the wiper blade assembly 37 as the latter rotates, greatly reducing the energy required for such rotation. The fabrication of arms 56, and mounting flange 54 attached thereto, from steel makes the wiper blade assembly 37 sufficiently strong so that the blade 52 can be relatively narrow, with respect to its radial dimension, maximizing the area of opening 57. Furthermore, since the blade 52 itself need not be particularly strong, it can be fabricated from a softer material such as a soft metal or a high temperature plastic, to avoid wear and damage to the extruder barrel 32. Attachment of the blade 52 to mounting flange 54 by means of blade fasteners 60 allows the blade to be replaced as it wears, avoiding the more expensive alternative of replacing the entire assembly, and providing a distinct cost advantage. Provision of the opening 57 not only confers significant advantages in terms of energy conservation, but in addition, it is essential for use with extruder barrels below about eight inches in diameter, since the employment of scrapers without such openings below that diameter would result in the scrapers covering essentially all of the annular space between the inner wall of the barrel and the feed screw. A scraper so configured is forced to move the entire plastic melt transversely, creating an intolerable situation in terms of energy consumption and resultant frictional heat.

Figure 3:
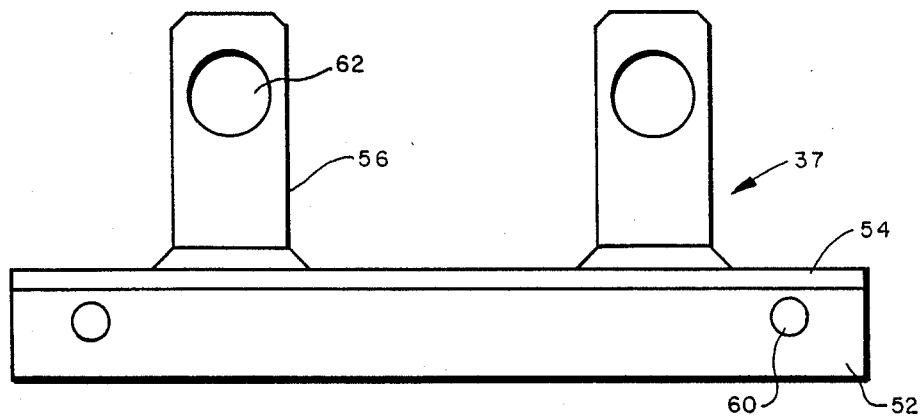
FIG. 3 shows a front elevation of a wiper blade assembly of the invention.

FIG. 3 shows a front elevation of a wiper blade assembly 37 comprising the blade 52, attached by blade fastener 60 to a mounting flange 54. The mounting flange 54 is in turn attached to, or forms an integral part of, arms 56 which are provided with mounting holes 62, allowing them to be attached to mounting ridges 38.

The dimensions of the blade assembly and its various components will vary, depending upon the nature of the cooler-extruder, its size, and the other factors previously referred to. For purposes of illustration, however, in the case of a cooler-extruder utilizing a barrel having an internal diameter of about six inches, the length of the blade 52 will commonly be about five to seven inches, and its height from about one half to three quarters inch. The arms 56 of the blade assembly 37 will ordinarily be in the range of from about two to three inches long, measured from the top edge of the blade. A six inch cooler-extruder will normally have a compound feed screw about two and a half to three and a half inches in diameter, and will be provided with circular ridges 38 having a diameter of from about three and one half to four inches in diameter, spaced about two and one half to three inches apart. Typically, the flights' section will include from about five to fourteen pairs of blade assemblies, positioned sequentially along the longitudinal axis of the compound feed screw 30. As previously mentioned, the selection of dimensions of the cooler-extruder components may readily be determined by the application of principles known to those skilled in the art.

Figure 4:
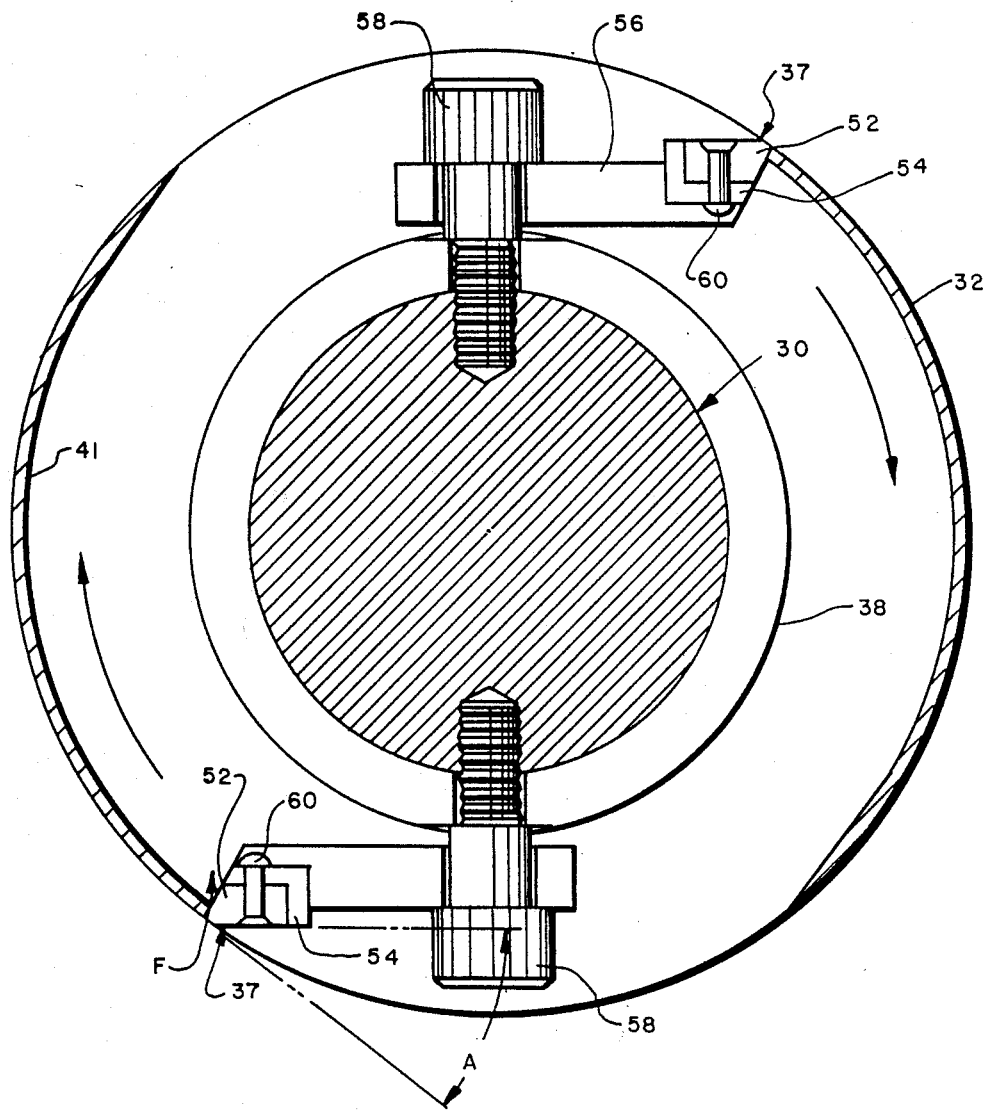
FIG. 4 shows a sectional view of an end elevation of a wiper blade assembly, mounted on a compound feed screw within an extruder barrel.

FIG. 4 is a sectional view of an end elevation of the wiper blade assembly of FIG. 2, mounted on a compound feed screw within an extruder barrel. The Figure shows a compound feed screw 30 located within barrel 32, the inside wall only of which is illustrated. Mounted on the compound feed screw 30, as an integral part thereof, is a circular ridge 38, to which is attached a pair of wiper blade assemblies 37. The wiper blade assemblies are positioned tangentially to the circular ridges 38, one hundred and eight degrees apart, and facing in opposite directions. Attachment to circular ridges 38 is accomplished by means of mounting screws 58. While the compound feed screw 30 in FIG. 4 is shown as a solid shaft, if desired, provision may be made for circulating cooling water therethrough by providing a hollow chamber in the compound feed screw through which the cooling water is circulated.

The Figure provides further detail relative to wiper blade assembly 37, showing how blade 52 is fastened to mounting flange 54 by means of blade fasteners 60, in the case of the Figure, with rivets. Also shown is the mounting relationship between arms 56 and the mounting flange 54.

FIG. 4 assumes rotation of the compound feed screw in a clockwise direction, bringing the stationary deposits 41 in contact with the leading edge of blades 52, which remove the deposits from the inner surface of barrel 32. A further significant advantage of mounting wiper blade assemblies 37 on circular ridges 38 is that such a mounting positions the wiper blade assembly further from the center of the compound feed screw 30 than would be the case if the wiper blade assembly were fastened directly thereto. As a consequence of being mounted further from the axis of the compound feed screw 20, the wiping angle A is minimized, reducing the frictional force component F which is responsible for an energy consuming drag on blade 52.

Figure 5:
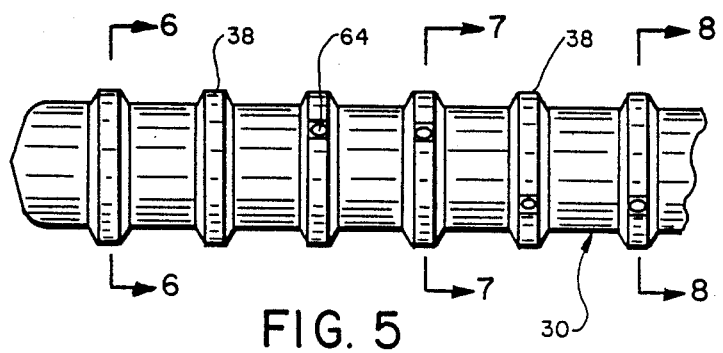
FIG. 5 shows a portion of the wiper section of a compound feed screw without wiper blade assemblies mounted thereon.

FIG. 5 illustrates a portion of the wiper section of a compound feed screw without the wiper blade assemblies mounted thereon. The Figure shows a number of pairs of circular ridges 38 machined as an integral part of compound feed screw 30, each such pair being provided with anchor holes 64 located 180° apart, with the anchor holes of each pair being circumferentially displaced relative to the mounting holes located on the adjacent pair of circular ridges. The angle of radial displacement may vary from that shown in the Figure.

Figure 6:
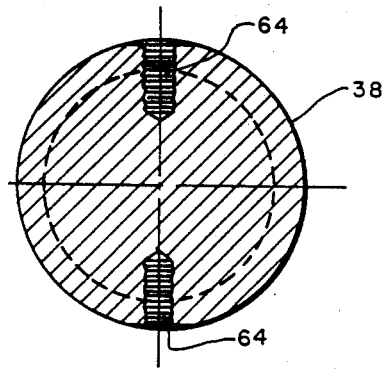
FIGS. 6, 7 and 8 are a series of cross-sections of the compound feed screw of FIG. 5 along lines 6—6, 7—7, and 8—8, showing the radial displacement of adjacent mounting points for the wiper blade assemblies.
Figures 7, 8:
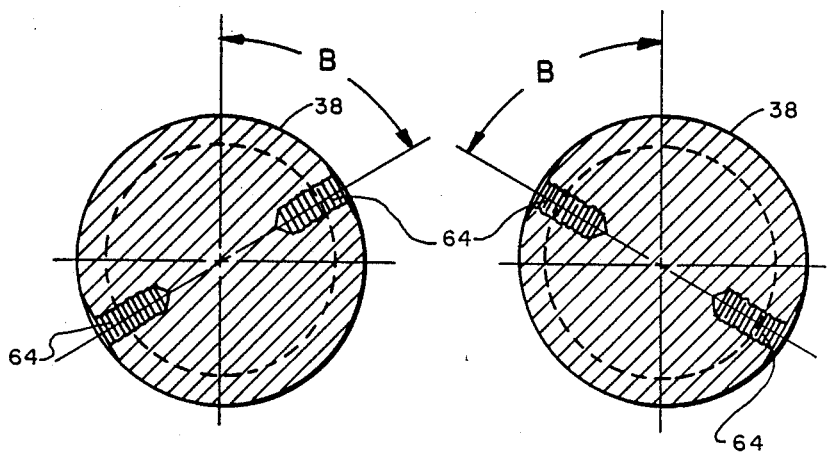

FIGS. 6, 7 and 8 illustrate a series of cross-sections of the compound feed screw of the invention showing the radial displacement of adjacent mounting points for the blade wiper assemblies. In FIGS. 6, 7 and 8 anchor holes 64 on each circular ridge 38 can be seen to be 180° apart, with the radial displacement of the anchor holes on adjacent pairs of ridges being about 60°, relative to each other. The invention lends itself to the conversion of existing secondary extruders by substituting a compound feed screw designed in accordance with the novel features of the invention described herein, for the original feed screw of the latter. The screws in such secondary extruders may be modified by removing part of the original screws' flights, and machining the altered portion to provide circular ridges to which the wiper blade assemblies of the invention can be attached. In either case, appropriate modification of the temperature control units is also required.

While in accordance with the patent statutes, a preferred embodiment and best mode have been presented, the scope of the invention is not limited thereto, but rather is measured by the scope of the attached claims.

What is claimed is:

1. A cooler-extruder employing a compound feed screw which includes a flights' section adjacent to a wiper section, and which is positioned in a first barrel to propel plastic material in said first barrel through said flights' section, and then through said wiper section, wherein said flights' section comprises a helical spiral ridge which forms an integral part of, and around a rotatable shaft, and said wiper section comprises a plurality of wiper blade assemblies tangentially mounted on pairs of spaced apart, raised circular ridges on said shaft, adjacent wiper assemblies being mounted radially displaced relative to each other, and wherein said first barrel is provided with means for cooling the material being propelled therethrough, said cooler-extruder being in communication with a primary foam extruder wherein a blowing agent is introduced into melted plastic being propelled by a feed screw through a second barrel of said primary extruder, after which the plastic material is introduced into said cooler-extruder.

2. A cooler-extruder according to claim 1 in which two wiper blade assemblies are mounted about one hundred and eighty degrees apart on each pair of said circular ridges.

3. A cooler-extruder according to claim 1 wherein said wiper blade assemblies comprise parallel, spaced apart arm members attached on one end thereof to said circular ridges, and at the other end thereof to a mounting flange supporting a blade member, thereby providing an opening between said mounting flange, said arm members, and said shaft, and wherein the outermost edge of said blade member is disposed parallel to, and immediately adjacent to the inner wall of said first barrel.

4. A cooler-extruder according to claim 3 wherein said blade member is replaceable.

5. A cooler-extruder according to claim 3 in which said arm members are attached to said circular ridges by means of threaded fasteners, and said blade member is attached to the mounting flange by means of removable fasteners.

6. A cooler-extruder according to claim 1 wherein said cooling means comprises at least one annular chamber positioned around the outside of said first barrel through which a liquid heat exchange medium is passed.

7. A cooler-extruder according to claim 1 in which said plastic material is a plastic foam which passes through a die after passing through said wiper section.

8. A cooler-extruder according to claim 7 which said plastic foam is a polystyrene foam.

9. A cooler-extruder according to claim 1 in which adjacent wiper assemblies are radially displaced relative to each other by about sixty degrees.

10. A cooler-extruder according to claim 1 wherein the said wiper section constitutes from about thirty percent to forty percent of the total combined length of said wiper and flights' sections.

11. A cooler-extruder according to claim 1 in which the ratio of the distance between the point of entry of said plastic material into said first barrel, and the point of exit of said plastic material from said first barrel, to the inside diameter of said first barrel, is from about sixteen to thirty-two.

12. A cooler-extruder according to claim 1 in which said melted plastic is polystyrene.

13. A wiper blade assembly adapted for mounting on a shaft of a plastic foam extruder comprising a removable blade member attached to a blade supporting mounting flange, said mounting flange having two parallel, spaced apart arm members connected thereto, and disposed at right angles therefrom, said arms furnishing means for attaching said assembly to circular ridges forming an integral part of said shaft so as to provide an opening between said blade supporting mounting flange, said arms, and said shaft.

* * * * *